(12) United States Patent (10) Patent No.: US 8,150,904 B2
Queck et al. (45) Date of Patent: Apr. 3, 2012

(54) DISTRIBUTION OF DATA AND TASK INSTANCES IN GRID ENVIRONMENTS

(75) Inventors: Tobias Queck, Borkheide (DE); Mark Wusthoff, Carrickfergus (GB)

(73) Assignee: SAP AG, Walldorf (DE)

( * ) Notice: Subject to any disclaimer, the term of this patent is extended or adjusted under 35 U.S.C. 154(b) by 1331 days.

(21) Appl. No.: 11/713,966

(22) Filed: Feb. 28, 2007

(65) Prior Publication Data

US 2008/0209434 A1 Aug. 28, 2008

(51) Int. Cl.
*G06F 9/46* (2006.01)

(52) U.S. Cl. ........................................ 709/201; 718/105

(58) Field of Classification Search .................. 709/201; 718/105

See application file for complete search history.

(56) References Cited

U.S. PATENT DOCUMENTS

| | | | | |
|---|---|---|---|---|
| 2004/0148273 | A1* | 7/2004 | Allen et al. | 707/2 |
| 2005/0022203 | A1* | 1/2005 | Zisapel et al. | 718/105 |
| 2005/0273511 | A1 | 12/2005 | Andrade et al. | |
| 2007/0174290 | A1* | 7/2007 | Narang et al. | 707/10 |
| 2007/0250365 | A1* | 10/2007 | Chakrabarti et al. | 705/8 |

OTHER PUBLICATIONS

Lamehamedi, Houda, et al., "Distributed Data Management Services for Dynamic Data Grids", Department of Computer Science, Rensselaer Polytechnic Institute (May 16, 2005).
Lamehamedi, Houda, et al., "Simulation of Dynamic Data Replication Strategies in Data Grids" (Apr. 2003).
Treadwell, J., "Open Grid Services Architecture", http://forge.gridforum.org/projects/ogsa-wg, (Jan. 25, 2005).
Office Action for Chinese Application No. 200810080672.2 (with English Translation), mailed Apr. 26, 2011, 8 pages.

\* cited by examiner

*Primary Examiner* — Wing Chan
*Assistant Examiner* — Kostas Katsikis
(74) *Attorney, Agent, or Firm* — Brake Hughes Bellermann LLP (57) ABSTRACT

A partition analyzer may be configured to designate a data partition within a database of a grid network, and to perform a mapping of the data partition to a task of an application, the application to be at least partially executed within the grid network. A provisioning manager may be configured to determine a task instance of the task, and to determine the data partition, based on the mapping, where the data partition may be stored at an initial node of the grid network. A processing node of the grid network having processing resources required to execute the task instance and a data node of the grid network having memory resources required to store the data partition may be determined. The task instance may be deployed to the processing node, and the data partition may be re-located from the initial node to the data node, based on the comparison.

17 Claims, 7 Drawing Sheets

DISTRIBUTION OF DATA AND TASK INSTANCES IN GRID ENVIRONMENTS

TECHNICAL FIELD

This description relates to grid computing.

BACKGROUND

Grid computing environments generally refer to distributed, networked computing models in which a plurality of computers are used collaboratively to solve one or more problems. Often, such problems to be solved are computationally intensive, and would require extensive and expensive resources to accomplish in a conventional computing arena. For example, problems such as the modeling of weather patterns or financial markets may be approached using grid computing, where such problems may be difficult and expensive to solve using a single computer. Thus, grid computing may provide a cost-effective, reliable way to approach computationally-intensive problems.

Compared to such computationally-intensive software applications, many software applications may alternatively (or additionally) be database intensive. That is, such applications may require large and/or frequent calls (e.g., queries) to a database. For example, in an enterprise context, it often may occur that the enterprise maintains a large, central database, which may store, for example, large amounts of data related to customers, employees, procedures, or other business-relevant data. Database-intensive applications may thus access the central database in order to perform associated functionality, such as generating customer reports, or processing the payroll of the enterprise. It may therefore be difficult to implement such database-intensive applications in a grid computing environment, since the benefits of using distributed computing resources, as in the grid computing model, may be diminished or outweighed by the time and resources necessary to access the required data within that context.

SUMMARY

According to one general aspect, a system includes a partition analyzer configured to designate at least one data partition within a database of a grid network, and further configured to perform a mapping of the data partition to at least one task of an application, the application to be at least partially executed within the grid network. The system also includes a provisioning manager configured to determine a task instance of the at least one task, determine the data partition, based on the mapping, the data partition being stored at an initial node of the grid network, determine a processing node of the grid network having processing resources required to execute the task instance and a data node of the grid network having memory resources required to store the data partition, based on a latency therebetween, make a comparison as to whether an execution time of the task instance with the data partition at the data node will be less than a default execution time of the task instance with the data partition remaining at the initial node, deploy the task instance to the processing node, and re-locate the data partition from the initial node to the data node, based on the comparison.

According to another general aspect, a task instance to be executed is determined, and a data partition associated with execution of the task instance and stored at an initial node of a grid network may be determined. A processing node of the grid network having processing resources required to execute the task instance and a data node of the grid network having memory resources required to store the data partition, may both be determined, based on a latency therebetween. A comparison may be made as to whether an execution time of the task instance with the data partition at the data node will be less than a default execution time of the task instance with the data partition remaining at the initial node. The task instance may be deployed to the processing node, and the data partition may be re-located from the initial node to the data node, based on the comparison.

According to another general aspect, a computer program product may be tangibly embodied on a computer-readable medium and may include executable code. The executable code, when executed, may be configured to cause a data processing apparatus to receive a task instance to be executed on a grid network, the task instance being instantiated from a task of an application. The executable code, when executed, may be configured to cause the data processing apparatus to determine a data partition from a database associated with the application, based on the task instance, the data partition being associated with the task and stored on an initial node of the grid network. The executable code, when executed, may be configured to cause the data processing apparatus to determine a processing node of the grid network having sufficient processing resources to execute the task instance, and determine a data node of the grid network having sufficient memory resources to store the data partition. The executable code, when executed, may be configured to cause the data processing apparatus to determine that an execution time of the task instance at the processing node with the data partition having been transferred from the initial node to the data node is less than a default execution time of the task instance at the processing node with the data partition remaining at the initial node. The executable code, when executed, may be configured to cause the data processing apparatus to deploy the task instance to the processing node, and transfer the data partition from the initial node to the data node.

The details of one or more implementations are set forth in the accompanying drawings and the description below. Other features will be apparent from the description and drawings, and from the claims.

DETAILED DESCRIPTION

Figure 1:
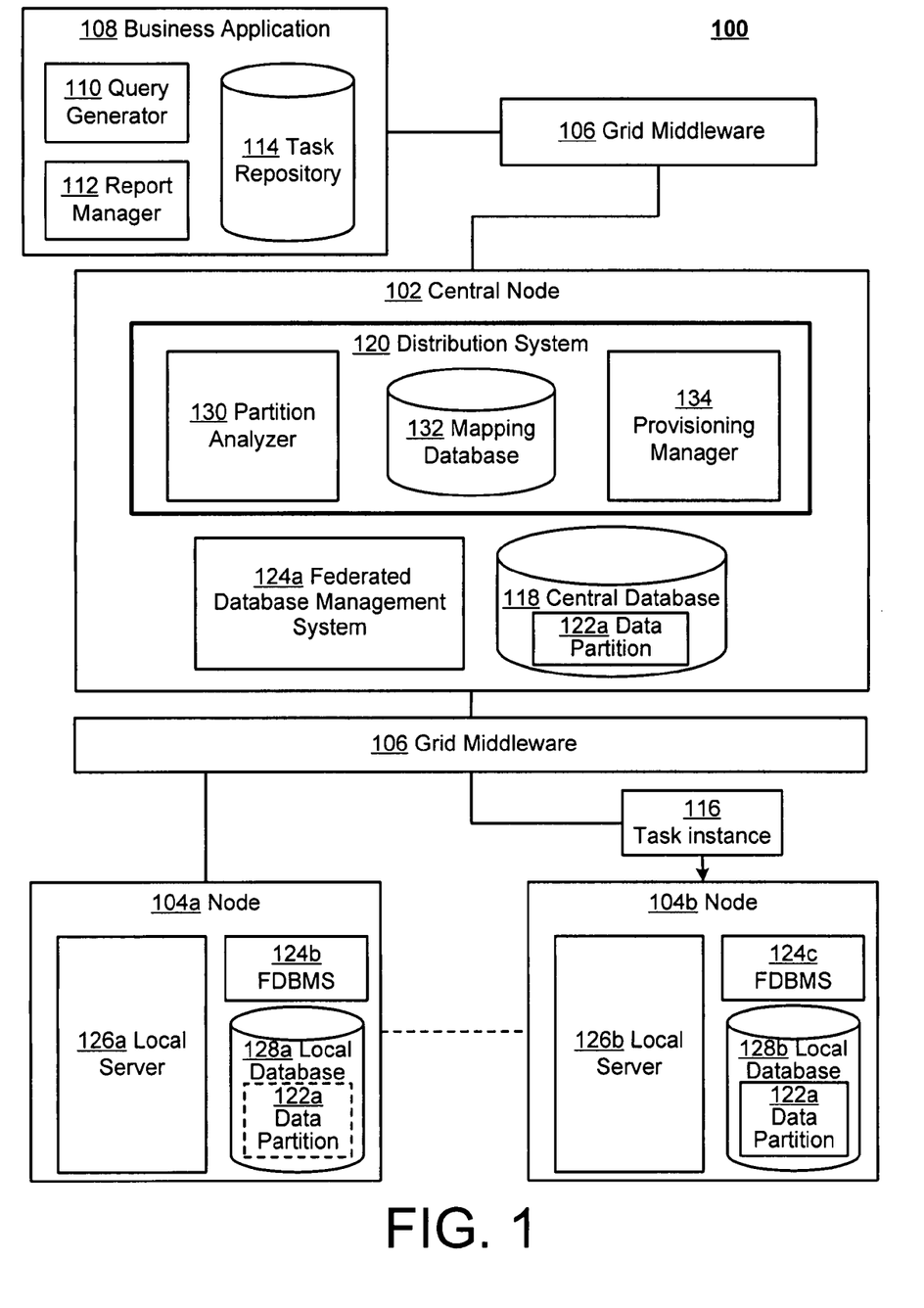
FIG. 1 is a block diagram of a system for distributing data and task instances in a grid environment.

FIG. 1 is a block diagram of a system 100 for distributing data and task instances in a grid environment, to thereby allow database-intensive applications to benefit from the grid environment of FIG. 1, e.g., to benefit from the increased processing resources, increased reliability, and decreased costs associated with the grid environment. More specifically, such database-intensive applications may obtain such benefits by, for example, a provisioning of both task instances and corresponding data of the database-intensive applications within the grid environment, where the corresponding data in this context refers to data that has been designated as being highly useful to its associated task(s). Such task instances and corresponding data may be provisioned within the grid environment, such that a latency of data calls of the task instances to the corresponding data (and corresponding returns of the called data back to the task instances) is minimized. By minimizing this latency, an overall execution time of the database-intensive applications may be optimized and/or improved, while still capturing the just-mentioned benefits of the grid environment of FIG. 1.

In the system 100 of FIG. 1, the grid environment or grid network includes a central node 102 and a plurality of nodes 104a, 104b. In this regard, it will be appreciated that the central node 102 and/or the nodes 104a, 104b may refer to hardware and/or software (e.g., virtual) implementations of a device(s) of a grid network. For example, the central node 102 may refer to a computing device at which large amounts of data are stored, such as when a global enterprise stores one or more large databases at a corporate headquarters of the enterprise. Meanwhile, the nodes 104a, 104b represent any number of nodes that may be connected to the central node 102, and may refer, for example, to virtually any computing device having sufficient processing and/or memory capabilities to perform the operations described herein. For example, the central node 102 and/or the nodes 104a, 104b may include laptop or other personal computer(s), or may include (or be associated with) enterprise servers or other potentially resource-rich computing devices, as would be apparent.

In the example of FIG. 1, grid middleware 106 is illustrated that refers to software that facilitates implementation and operation of the grid environment of the system 100 of FIG. 1. For example, the grid middleware 106 may be used to deploy/transfer task instances within the grid environment, and, more generally, may be used to facilitate and accommodate the use of various different applications, protocols, platforms, operating systems, architectures, or other parameters across the grid environment of FIG. 1. Similarly, the grid middleware 106 may be used to synchronize or otherwise coordinate operations of the nodes 104a, 104b (and other nodes, not shown in FIG. 1). Thus, one of the features of grid computing is generally to obtain a substantially homogeneous result from a potentially heterogeneous environment, and the grid middleware 106 may be instrumental in obtaining this result.

Further in FIG. 1, an example of the database-intensive applications mentioned above is illustrated as a business application(s) 108. In this regard, the term business application should be interpreted broadly as including virtually any application that may be used in profit generation of some sort, although the business application 108 also may refer to non-profit endeavors as well, including, for example, schools, governments, churches, charities, hospitals, or virtually any other organization. Further, the business application 108 is merely an example, and other applications, such as applications for personal use, also may be used.

As referenced herein, the business application 108 may perform various functionalities that may require access to relevant data in order to complete an execution of the functionalities in question. Merely by way of example, then, the business application 108 is illustrated as including a query generator 110 and a report manager 112. For example, in a payroll example, an enterprise may query relevant data to determine a current wage or salary that may be due to one or more employees, using the query generator 110. As another example, the report manager 112 may be used to generate reports regarding various business aspects, including, for example, current inventory levels, or current accounts payable/receivable information.

Such application-specific functionalities may be referred to as tasks, which may be stored in a task repository 114. Generally speaking, such tasks may represent reusable, previously-tested components or objects, instances of which may be used individually or together to obtain a desired result. For example, the business application 108 may provide virtually any functionality that may be provided by an application over a network, including, for instance, providing stock quotes, providing airline or other reservations, providing purchasing/invoicing functionalities, or providing some aspect of supply chain management or inventory control.

In some examples, the tasks of the task repository 114 may include tasks to be performed, as well as messages that may be sent/received as part of such tasks. Such tasks may be joined and ordered to obtain a desired result, such as in a process model, in which, as is known, such tasks may be graphically represented for easy understanding and manipulation thereof on a graphical user interface. In these contexts, the tasks may be joined by appropriate edges (arrows) and control tasks (e.g., splits and/or joins) to obtain structures including parallel tasks, iterative tasks, nested loops, or other known task progressions.

Additionally, or alternatively, tasks of the business application 108 may be executed, at least in part, using application services (e.g., as part of a service-oriented architecture (SOA)). Such application services may refer to applications having one or more specific functionalities that are exposed to other applications, often over a network (e.g., the Internet) by way of a service interface (where an operation and use of the interface may be known or determined, as needed). When such a service (and/or an interface of the service) is exposed/available over the World Wide Web (referred to herein as the WWW or the web), then the provisioning service may be known as a web service.

Languages exist, such as, for example, the Business Process Execution Language (BPEL), that are designed to provide compositions of such services (e.g., web services), and that may thus provide a top-down, process-oriented approach to the SOA. Accordingly, BPEL or other such languages (such as, for example, the Web Services Flow Language (WSFL), the eXtensible language (XLANG), and/or the Business Process Modeling Language (BPML)), or modifications/extensions thereof, which may be used to define, coordinate, and/or deploy tasks of the task repository 114.

Thus, tasks of the task repository 114 represent generic components having specified functionalities, and the tasks may be instantiated to perform particular implementations of the business application 108. For example, the business application 108 may include tasks for calculating a payroll of the enterprise, where such tasks may include determining current employees, determining a current salary structure of the enterprise, and determining an affect, if any, of individual employees' individual situations (e.g., number of hours worked, or number of sick days used). Of course, these are just examples, but it will be appreciated therefrom that (for a monthly payroll processing) different instances of these tasks may be created for each month of a year, and "January" instances of the tasks may be different from "February" instances of the tasks, since, for example, various parameters will or may change from month to month (e.g., a number of days or holidays in the month, an amount of bonuses applied in a given month (e.g., an end-of-year bonus), or other payroll-relevant variables).

In operation, then, the business application 108 may wish to perform such payroll processing, or other functionality, in a distributed manner. For example, the node 104a may be located in New York, while the node 104b may be located in London, where the node locations may correspond to operational centers of the enterprise in question. In this case, the business application 108 may use the grid middleware 106 and the central node 102 to distribute, deploy, provision, or otherwise provide a task instance 116 to the node 104b, for execution by the node 104b. Of course, it will be appreciated that a large number of task instances may need to be deployed to a plurality of nodes, and that the singular task instance 116 is illustrated in FIG. 1 merely for the sake of illustration.

As referenced above, such distribution of the task instance 116 to the node 104b may improve an overall reliability and execution time of the task instance 116, and of the application 108 as a whole, by leveraging available computing resources of the node 104b. As also referenced above, however, such advantages may (or may not) be outweighed by the fact that the task instance 116, during execution thereof, may need to access (e.g., make data calls to) a central database 118 of the central node 102.

For example, and continuing the payroll example provided above, the central database 118 may include a current list of employees of the enterprise, as well as other payroll-relevant data. Consequently, the task instance 116 may need to make queries against, or other data calls to, the central database 118, in order to perform its associated payroll calculation(s). However, in a case where, for example, the node 104b is located at a distance from the central node 102 (such as when the node 104b is located in London and the central node 102 is located in Walldorf), there may be a non-trivial latency associated with each such call of the task instance 116. Depending on factors such as, for example, a size of the latency and/or a quantity or frequency of the data calls, the resulting increase in execution time of the task instance 116 may outweigh the computational advantage of deploying the task instance 116 to the node 104b in the first place.

In the example of FIG. 1, the central node 102 includes a distribution system 120 that may be configured to take the above considerations into account by deploying a data partition 122a in conjunction with the task instance 116. More specifically, the distribution system 120 may be configured to divide the data of the central database 118 into two or more such data partitions, where such data partitions may include sets of coherent data that are individually united but disjunctive from one another, so that no synchronization is needed to ensure data consistency therebetween. For example, the data partition 122a may include a block of data associated with employees in London, which may be disjunctive from a similar partition of data (not illustrated in FIG. 1) associated with employees in New York (where, e.g., the hiring of an employee in London and corresponding update to the data partition 122a may not require synchronization with the corresponding data partition associated with employees in New York).

As described in more detail below, the distribution system 120 may divide or otherwise determine the data partition 122a from within the data of the central database 118, based on a task of the task instance 116 itself, so that it is known in advance that the data partition 122a includes data that will most-frequently and/or most-likely be called by the task instance 116. In this way, most or all of the data calls from the task instance 116 may be made to the data partition 122a, so that if, for example, the task instance 116 and the data partition 122a are both deployed to the node 104b together, a latency associated with data calls of the task instance 116 may be drastically reduced or effectively eliminated, which may result in a corresponding decrease in an overall execution time of the task instance 116 (and of the application 108 as a whole).

In partitioning, deploying, transferring, and/or re-joining the data partition 122a from/to the central database 118, a federated database management system (FDBMS) 124a, 124b, 124c may be used. As shown, the FDBMS 124a, 124b, and 124c may execute on each of the central node 102, the node 104a, and the node 104b, respectively. Such systems may be used to form a virtual, federated database from a plurality of distributed databases, so that a singular, uniform interface may be presented to a human or machine user for accessing the federated data. For example, conventional storage grids may be used which may implement such federations of databases to take advantage of distributed storage resources and requirements, much as the computational grids described above may be used to take advantage of distributed processing resources and requirements. As part of such conventional storage grids, federated database management systems may be used to transfer individual databases between nodes, for reasons such as current unavailability or malfunction of a given node, or for other known reasons.

In the example of FIG. 1, however, the FDBMS 124a, 124b, 124c may be used by the distribution system 120 to facilitate partitioning and deployment of the data partition 122a. That is, although the FDBMS 124a, 124b, 124c may be used as described above to provide a single interface for distributed data, it will be appreciated from the present description that the FDBMS 124a, 124b, and 124c may be additionally or alternatively used as part of a larger process(es) to create, distribute, deploy, transfer, or otherwise provide the data partition 122a within the grid environment of FIG. 1, e.g., at the direction of the distribution system 120.

In this way, the task instance 116 may be executed on a server 126b (which may be implemented in hardware or software at the node 104b), while the data partition 122a may be stored in a local database 128b (which may be implemented, for example, using any standard memory techniques) of the local node 104b. Consequently, as described herein, the task instance 116 may be executed with a minimal latency being associated with required data calls to the data partition 122a (due, in this example, to the co-location of the task instance 116 and the data partition 122a at the node 104b).

As referenced above and described in more detail below with reference to FIGS. 4 and 5, the distribution system 120 may include a partition analyzer 130. The partition analyzer 130 may be configured to analyze the tasks of the task repository 114, the content and structure of the central database 118, and various other relevant factors, and may thereafter divide the data of the central database 118 to include the data partition 122a (and possibly other partitions, not illustrated in FIG. 1). For example, using the payroll example above, the partition analyzer 130 may be configured to analyze the task from which the task instance 116 was instantiated, and to determine that the task is highly-specific to a particular geographical region or location (e.g., may be associated with data for groups of employees who are in specified regions/locations). Consequently, the partition analyzer 130 may split the central database into the data partition 122a (associated with London-based payroll operations), as well as into other data partitions associated with other regions/locations.

Thereafter, a mapping database 132 may be used to store the determined relationships between tasks and data partition(s). For example, as illustrated in FIG. 4, one or more tasks may be mapped to a single data partition (e.g., the data partition 122a). For example, as described above, there may be a plurality of payroll-associated tasks associated with performing monthly payroll processing, and most or all of these tasks may be mapped to a corresponding, geographically-defined, data partition. Thus, there may exist a 1:n mapping between data partitions and task instances.

During a run-time of the business application 108, e.g., at the end of a current month when payroll processing begins, a provisioning manager 134 of the distribution system 120 may be configured to deploy the task instance 116, and related task instances of tasks of the task repository 114, to one or more nodes 104a, 104b of the grid environment. As referenced herein, the provisioning manager 134 also may be configured to determine whether and how to deploy (e.g., transfer) the data partition 122a within the grid environment of FIG. 1.

A more specific example of the provisioning manager 134 is provided below, with regard to FIG. 6, and examples of operations of the provisioning manager 134 are provided with regard to FIG. 7. In general, though, it may be appreciated that the provisioning manager 134 may be configured to determine a number of factors to decide whether and how to deploy the task instance 116 and the data partition 122a. For example, the provisioning manager 134 may determine currently-available computing and memory resources available at each of the nodes 104a, 104b of the grid environment. Further, the provisioning manager 134 may determine a latency associated with one or more pairs of the nodes 104a, 104b (and other nodes, not illustrated). Then, the provisioning manager 134 may make a determination as to whether and how the data partition 122a should be deployed in order to improve an execution time of the task instance 116.

For example, as described below with regard to FIG. 2, it may occur that the data partition 122a is initially located at the central node 102, within the central database 118. In this case, the provisioning manager 134 may determine that a time needed to transfer the data partition 122a to the node 104b may be sufficiently great, e.g., relative to a processing time or complexity of the task instance 116, that transfer of the data partition 122a to the node 104b may not result in a net or appreciable reduction of an execution time of the task instance 116. In other words, the provisioning manager 134 may determine that the task instance 116 may complete faster by deploying the task instance 116 to the node 104b for subsequent calls therefrom to the central database 118, than by taking the time to transfer and deploy the data partition 122a from the central database 118 to the local database 128b of the node 104b.

In this scenario, it may occur nonetheless that the provisioning manager 134 may determine that the data partition 122a may be deployed to the local database 128a of the node 104a, as illustrated by the dashed-line representation of the data partition 122a. In other words, it may be more beneficial to have both the task instance 116 and the data partition 122a deployed onto the grid environment, even if the task instance 116 and the data partition 122a are not deployed onto the same node of the grid environment, than to leave the data partition 122a at the central database 118 for calls thereto from the deployed task instance 116. For example, it may occur that the node 104a (in contrast to the New York example, above) also may be located in London, so that a latency between the nodes 104a, 104b may be relatively minor compared to a latency between either of the nodes 104a, 104b and the central database 118 (e.g., in Walldorf).

In a final example scenario, which also is illustrated and discussed in more detail below with respect to FIG. 2, it may occur at the beginning of a deployment of the task instance 116 that the data partition 122 already may be located at the local database 128b of the node 104b. In this case, the provisioning manager 134 may determine that it is best to leave the data partition 122a at the node 104b, and may deploy the task instance 116 to the node 104b to take advantage of the minimal latency experienced by data calls of the task instance 116 in this scenario.

Various other examples are provided herein, and it will be appreciated that many modifications, not specifically discussed or illustrated, also may be implemented. For example, although shown as being separate from the central node 102, the business application 108 may be deployed on the central node 102. In other examples, it will be appreciated that different terminologies may be associated with the same or similar concepts described herein. For example, the term task instance may be replaced by, or substantially interchangeable with, the term job. Other variations and modifications may be apparent, as well.

Figure 2:
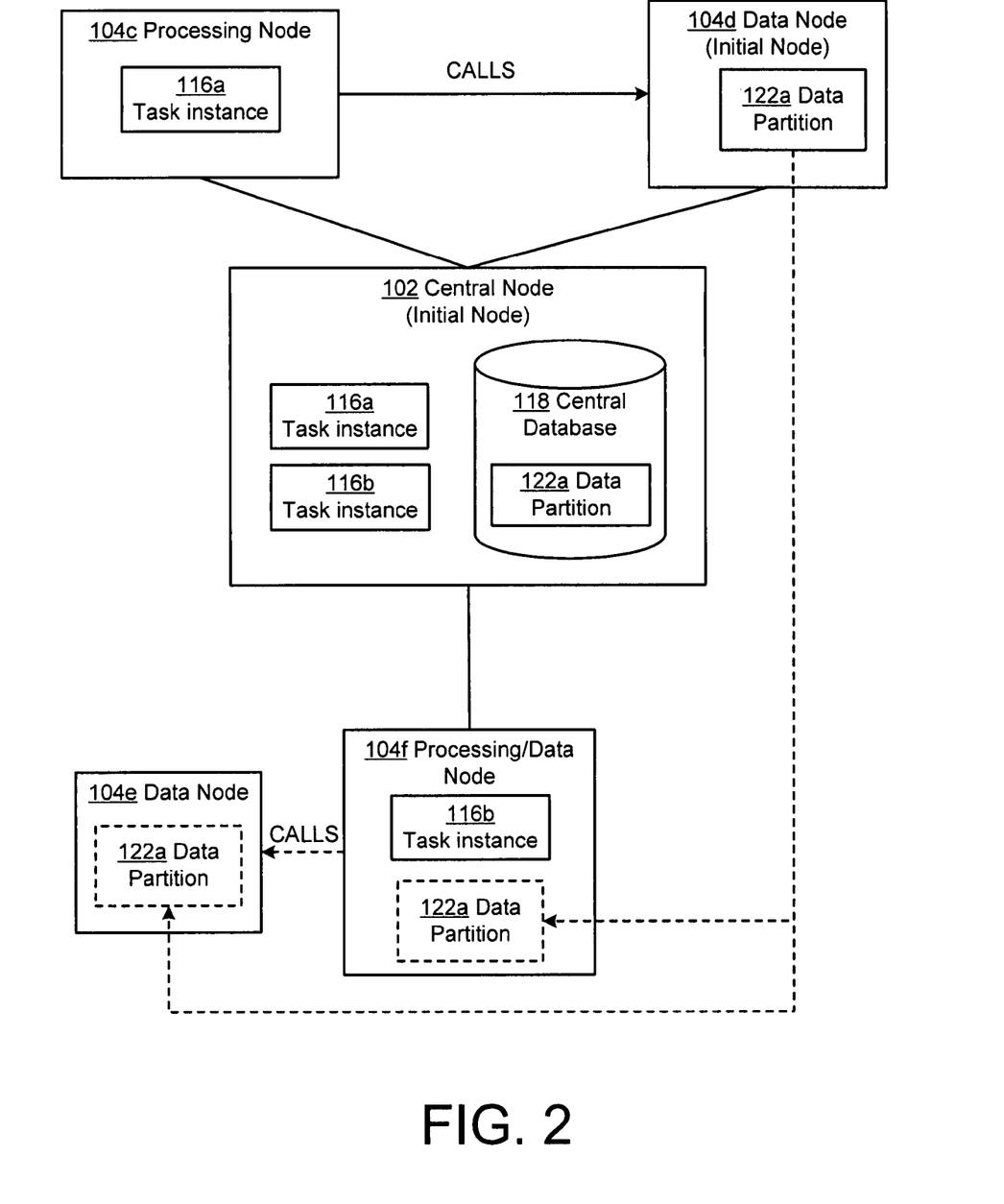
FIG. 2 is a block diagram illustrating example implementations of the system of FIG. 1.

FIG. 2 is a block diagram illustrating example implementations of the system of FIG. 1. In FIG. 2, it is assumed that at the beginning of a deployment or distribution process, the central node 102 is associated with task instances 116a, 116b to be deployed, as well as data partition 122a. In the first instance, then, it may occur that the task instance 116a is to be deployed to the node 104c, e.g., based on a determination by the distribution system 120 that the node 104c includes sufficient processing resources to execute the task instance. In order to illustrate that the node 104c is selected in this example based on its processing ability to process the task instance 116a, the node 104c is referred to in FIG. 2 as a "processing" node.

Analogously, it may be determined that the node 104d may be determined by the distribution system 120 to have sufficient memory resources to store the data partition 122a. In order to illustrate that the node 104d is selected in this example based on its available memory to store the data partition 122a, the node 104d is referred to in FIG. 2 as a "data" node. Somewhat similarly, the central node 102 may be referred to as an "initial node," since the data partition 122a is initially located there.

Further, as described in detail herein, it may be determined that transfer of the data partition 122a to the data node 104d may reduce an overall execution time of the task instance 116a, as compared to a baseline situation in which the data partition 122a simply remains in the central database 118. In other words, a comparison may be made between a first scenario in which the task instance 116a is deployed to the processing node 104c and executed by making calls to the data partition 122a in the central database 118, and a second scenario in which the task instance 116a is deployed to the processing node 104c and executed by making calls to the data partition 122a in the data node 104d. Whichever of the first scenario and the second scenario results in a reduced execution time may then be selected and executed.

Various example algorithms and parameters for making a decision between these two scenarios, and other scenarios, are discussed in more detail, below. In general, though, it may be appreciated that lower latencies between the processing node 104c and the data node 104d may result in an increased likelihood of reducing the execution time of the task instance 116a by deployment of the data partition node 122a to the data node 104d. The least amount of latency may occur when both the task instance 116a and the data partition 122a are both deployed to the same node, so that a practical latency time may approach zero. Consequently, it will be realized that the nomen clature of "processing node" and "data node" is used simply to illustrate the possible functions of the different nodes 104c, 104d, and, as described in detail herein (e.g., in FIG. 1), it may occur that a single node (e.g., the node 104b)

may operate as both the processing node and the data node, in which case, as just mentioned, an effective latency of calls from the task instance 116a to the data partition 122a may approach zero.

Continuing the example of FIG. 2 in which the data partition 122a is, in fact, deployed to the data node 104d, it may later occur that a task instance 116b is to be deployed from/through the central node 102. In the example of FIG. 2, it is illustrated that the task instance 116b is deployed to a node 104f. For example, the task instance 116b may require larger processing resources than are currently available at the node 104c, so that the node 104c is not suitable to receive the task instance 116b.

In this case, the distribution system 120 again may make a determination as to how to achieve a minimum execution time of the task instance 116b. For example, the task instance 116b may simply make data calls from the node 104f to the data partition 122a within the data node 104d. Of course, there may be an associated latency associated with each such call, but, nonetheless, an overall execution time of the task instance 116b may be minimized by selecting a node for receiving the task instance 116b that is as close as possible to the data node 104d (or that otherwise experiences a minimized latency in making calls to the data node 104d).

In other example implementations, however, an execution time of the task instance 116b may be reduced by transferring the data partition 122a from the data node 104d to the node 104f. In such an example, then, the node 104b may be considered to be the "initial node," inasmuch as the data partition 122a is initially situated there for the purposes of the (possible) transfer in question. In this example, then, the node 104f would serve as both the processing node and the data node, as shown in FIG. 2. Again, such a result may minimize or eliminate the latency associated with calls from the task instance 116b to the data partition 122a.

In a final example, it may occur that the data partition 122a may not be transferred to the node 104f, such as when the node 104f does not currently have sufficient memory resources to store the data partition 122a. In this example, the data partition 122a may instead be transferred to a node 104e, which would then server as the "data node" to the "processing node" 104f. Again, in order for such a transfer to be desirable, it may be assumed that a latency (and/or an execution time) experienced by the task instance 116b may be reduced/improved when the task instance 116b makes calls to the data node 104e, as compared to when the task instance 116b makes data calls to the data/initial node 104d.

Figure 3:
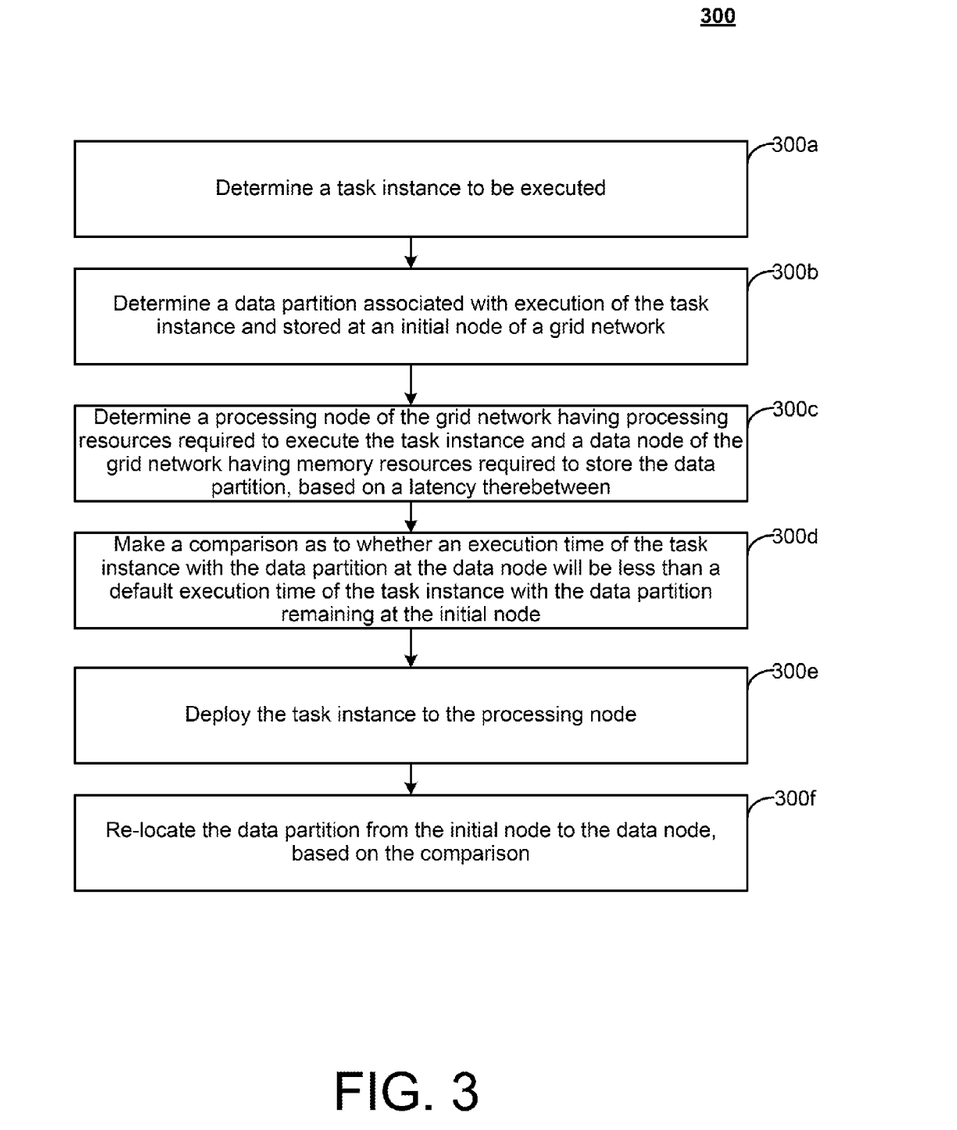
FIG. 3 is a flowchart illustrating example operations of the system of FIGS. 1 and 2.

FIG. 3 is a flowchart 300 illustrating example operations of the system of FIGS. 1 and 2. In the example of FIG. 3, a task instance to be executed may be determined 300a. For example, the provisioning manager 134 may receive notification from the business application 108 that a task of the task repository 114 has been instantiated as the task instance 116a (or 116b) for execution.

A data partition associated with execution of the task instance and stored at an initial node of a grid network may then be determined 300b. For example, the provisioning manager 134 may access the mapping database 132 to determine that the data partition 122a has been mapped to the task(s) from which the task instance 116a (and/or 116b) has been instantiated. In this example, it may be assumed that the partition analyzer 130 previously partitioned the central database 122a, mapped the data partition 122a as just described, and stored the result in the mapping database 132 for access by the provisioning manager 134. As will be appreciated from the above discussion of FIG. 2, an initial node in this context may refer to the central node 102, or any of the nodes 104a-104f at which the data partition 122a may be stored at a beginning of the operations of the flowchart 300 of FIG. 3.

A processing node of the grid network having processing resources required to execute the task instance may be determined, and, similarly, a data node of the grid network having memory resources required to store the data partition also may be determined, where such determinations may be made based on a latency therebetween 300c. For example, the provisioning manager 134 may determine a first plurality of nodes having sufficient processing resources currently available to execute the task instance 116a, such as the node(s) 104b/104c, to potentially receive the task instance 116a. Or, in other example(s) of FIG. 2, the provisioning manager 134 may determine that the node 104f has sufficient processing resources for executing the task instance 116b. Similarly, the provisioning manager 134 may determine a second plurality of nodes having sufficient memory resources required to store the data partition 122a. For example, the provisioning manager 134 may select any of the data nodes 104b or 104d-104f as such, depending on the task instance in question, and as just described.

Then, as described in more detail herein, different combinations of nodes of the first plurality of nodes and of the second plurality of nodes may be examined to determine latencies therebetween, and the processing node (e.g., one of 104b, 104c, or 104f) and the data node (e.g., one of 104a, 104b, 104d-104f) may be selected based on a minimal latency of the determined latencies. For example, referring to FIG. 2, if the provisioning manager 134 determines the first plurality of potential processing nodes as including nodes 104c and 104f, and then determines the second plurality of potential data nodes as including nodes 104d and 104f, then the node 104f may be selected as both the processing node and the data node (since, in this example, the node 104f is included in both groups of nodes, and since latency may generally be assumed to be effectively zero for communication between task instances and data partitions at a single node).

A comparison may be made as to whether an execution time of the task instance with the data partition at the data node will be less than a default execution time of the task instance with the data partition remaining at the initial node 300d. For example, in FIG. 1, the node 104b may serve as both the processing node and the data node. In a case where the initial node is the central node 102, then, the provisioning manager 134 may determine whether an execution of the task instance 116 at the processing/data node 104b (the execution time including a transfer time required to transfer the data partition 122a from the central database 118 to the local database 128b) is overall less than a default execution time of simply leaving the data partition 122a within the central database 118 (in which case, for example, the task instance 116 may be deployed to the processing/data node 104b and the task instance 116 may execute by making data calls back to the central node 102, as needed). Of course, in other examples, the initial node may be a node other than the central node, such as in the example of FIG. 2 above where the node 104d served as the initial node in one example). Also, additional or alternative parameters that may be included as part of the overall execution time or overall default execution time are discussed below, for example, with regard to Eqs. (1-14).

The task instance may then be deployed to the processing node 300e, such as when the provisioning manager 134 deploys the task instance 116 to the node 104b, as just referenced and as illustrated above in FIG. 1. In the example implementations described herein, it may be appreciated that the central node 102 is assumed to serve as a central deployment site for deploying task instances into the grid environment, and does not itself typically execute task instances. In some example implementations, however, it may be possible that a node used to deploy task instances may itself be capable of executing the task instances, when necessary or desired.

The data partition may be re-located from the initial node to the data node, based on the comparison 300f. For example, and continuing the example(s) above, if the provisioning manager 134 may make the comparison between a default execution time in which the data partition 122a is left in the central database 118 of the central node 102 (and receives calls from the task instance 116 at the node 104b) compared to an execution time that may result from performing the transfer of the data partition 122a to the local database 128b of the node 104b. Then, for example, in the situation where the execution time is less than the default execution time, then the provisioning manager 134 may use the federated database management system 124a,b to transfer the data partition 122a to the node 104b.

Figure 4:
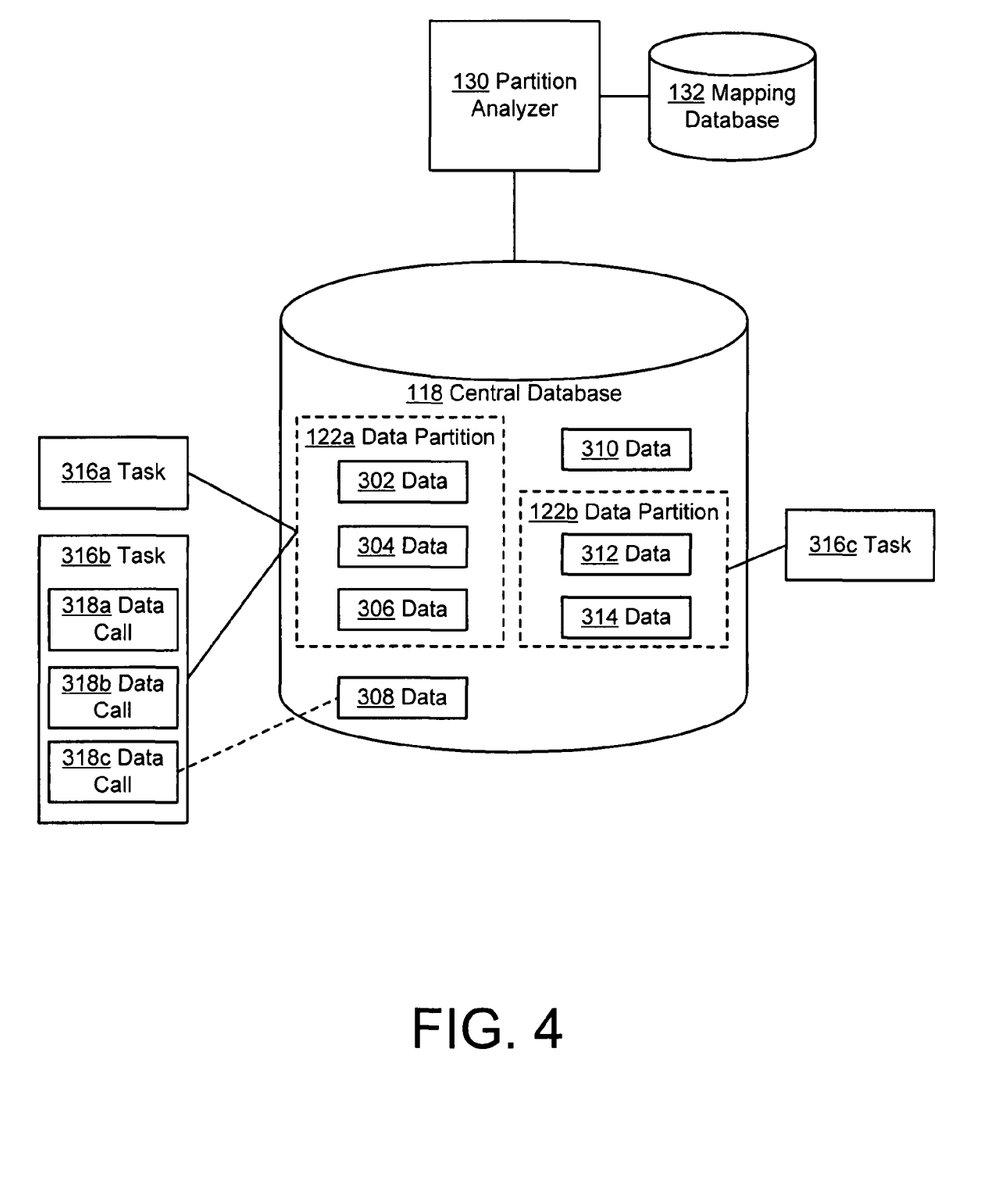
FIG. 4 is a block diagram of a partition analyzer of the systems of FIGS. 1 and 2.

FIG. 4 is a block diagram of the partition analyzer 130 of the systems of FIGS. 1 and 2. In the example of FIG. 4, the central database 118 is illustrated as containing data 302-314. Further, tasks 316a, 316b, and 316c are illustrated that may be understood to be stored in the task repository 114 of FIG. 1, and that may be used to execute the business application 108. During operation, then, the partition analyzer 130 may seek to analyze the tasks 316a, 316b, and 316c to determine access characteristics of the tasks 316a, 316b, and 316c with regard to the data 302-314, and to partition the central database 118, accordingly.

In the generic example of FIG. 4, it may occur that the task 316 exclusively accesses the data 302, 304, 306, while the task 316b may access the data 302, 304, 306, and 308. Meanwhile, the task 316c may generally access the data 312 and 314. In the example, none of the tasks 316a, 316b, 316c is expected to access the data 310.

Consequently, the partition analyzer 130 may form the data partition 122a as including the data 302, 304, and 306. Thus, it may be said that the task 316a exclusively access the data partition 122a. At the same time, it may be said that the task 316 predominantly or frequently accesses the data partition 122a (but sometimes or infrequently accesses the data 308). Meanwhile, the partition analyzer 130 may determine that the task 316c exclusively accesses the data partition 122b including the data 312 and 314.

It will thus be appreciated from the above description of FIGS. 1-3 that an instance of the task 316a and the data partition 122a may be deployed together, e.g., to the node 104b. In this case, the instance of the task 316a may have access to all the data required for execution, and, in this example, the latency for such access may effectively be zero. Consequently, the grid computing environment of FIGS. 1 and 2 may be utilized advantageously, without the detrimental effects of large or frequent data calls back to the central database 118 to slow down the execution time of a task instance of the task 316a.

Even though it may be most advantageous in a given implementation to have all of the calls of a task be made to a single data partition (such as the exclusive nature of the calls of the task 316a to the data partition 122a, and of the calls of the task 316c to the data partition 122b), it may still be advantageous to execute the provisioning of data and task instances when only some of a task's data calls are to a particular data partition. For example, data calls 318a and 318b of the task 316b are illustrated as being made to the data partition 122a, while data call 316c is made to the data 308, which is not included in any data partition and therefore may not be moved from the central database 118 (or would be moved by itself, if at all).

Thus, if a task instance of the task 316b is deployed to the node 104b together with the data partition 122a, then an overall execution time of the task instance of the task 316 may be improved. This is due to most or many of the data calls of the task instance being made to the locally-accessible (within the local database 128b) data partition 122a, even though at least some of the data calls (e.g., the data call 318c) may have to be made back to the central database 118.

Of course, the partition analyzer 130 may, in an alternate example implementation, define the data partition 122a as including all of the data 302-308. In this case, however, more data would have to be transferred whenever the data partition 122a were stored at a node of the grid network in question. If, for example, however, the data call 318c to the data 308 is very infrequent, or very small, then such additional data transfers may be unwarranted or detrimental. In other words, there would be a cost of including the data 308 in every transfer of the data partition 122a, for a benefit of only small or infrequent uses of the data 308. The partition analyzer 130 may thus be responsible for weighing these and other costs and benefits, so as to optimize the partitioning of the central database 118 for use by the provisioning manager 134.

Once partitioning has occurred, or in conjunction therewith, the partition analyzer 130 may store the resulting associations, or mappings, of the tasks 316a, 316b, and 316c and the data partitions 122a and 122b, within the mapping database 132. As shown, such mappings may be made n:1 as between tasks:partitions, since multiple tasks (e.g., the tasks 316a and 316b) may be mapped to a single data partition (e.g., the data partition 122a).

Figure 5:
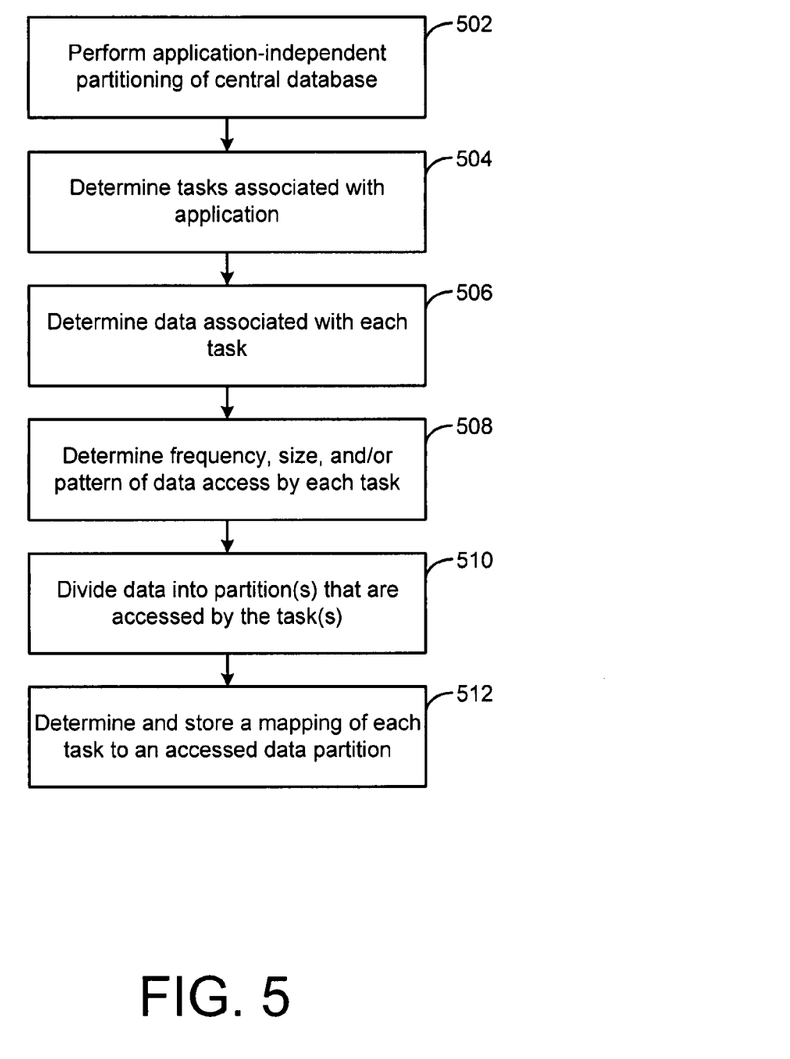
FIG. 5 is a flowchart illustrating example operations of the partition analyzer of FIG. 4.

FIG. 5 is a flowchart 500 illustrating example operations of the partition analyzer 130 of FIGS. 1 and 4. In the example of FIG. 5, application-independent partitioning of the central database 118 may occur (502). For example, the partition analyzer 130 may perform an initial partitioning of the central database 118 that is partially or completely independent of the business application 108 (e.g., that may be applicable to a plurality of such business applications). For example, as referenced above, the nodes 104a and 104b may be associated with New York and London offices of an enterprise in question. In this case, it may be logical, for a number of business applications, that the partition analyzer 130 may perform an initial partitioning of the central database 118 into location or office-specific partitions.

Tasks associated with an application may then be determined (504). For example, the partition analyzer 130 may determine that the tasks 316a, 316b, and 316c are associated with the application in question, e.g., the application 108.

Data associated with each task may then be determined (506). For example, the partition analyzer 130 may determine that the task 316a is associated with the data 302-306, the task 316b is associated with the data 308, and the task 316c is associated with the data 312, 314.

A frequency, size, and/or pattern of data access by each task, or any other relevant access characteristic, may be determined (508). For example, the partition analyzer 130 may determine that the task 316a exclusively accesses the data partition 122a in FIG. 4, and may determine that the task 316b frequently, but not exclusively, accesses the data partition 122a (but also accesses the data 308). As referenced above, an average size of data called by a particular task may outweigh an importance of an absolute number of data calls in characterizing the data access of the task(s). That is, if the task 316 accesses the data 308 a small number of times, but for large amounts of data each time, then the access of the task 316 to the data 308 may have a greater impact on an execution time of tasks instances of the task 316 than of access of the task 316 to the data partition 122a.

Data may be divided into partition(s) that are accessed by the task(s) (510), e.g., in accordance with the frequency, size, or access pattern of the data access, as just described. For example, the partition analyzer 130 may divide the data of the database 118 into the data partitions 122a and 122b, as described and illustrated above with respect to FIG. 4.

A mapping of each task to an accessed data partition may be determined and stored (512). For example, the partition analyzer 130 may determine that the task 316a should be mapped to the data partition 122a, while the task 316c should be mapped to the data partition 122b.

It will be appreciated that the techniques of FIGS. 4 and 5 are scaleable to very large sizes of datasets. For example, if the dataset of the central database 118 were to increase, and/or if any particular data partition 122a, 122b were to increase, then the partition analyzer 130 may simply increase a number of data partitions (and correspondingly reduce a size of each data partition), and may update the mapping database 132 accordingly.

Figure 6:
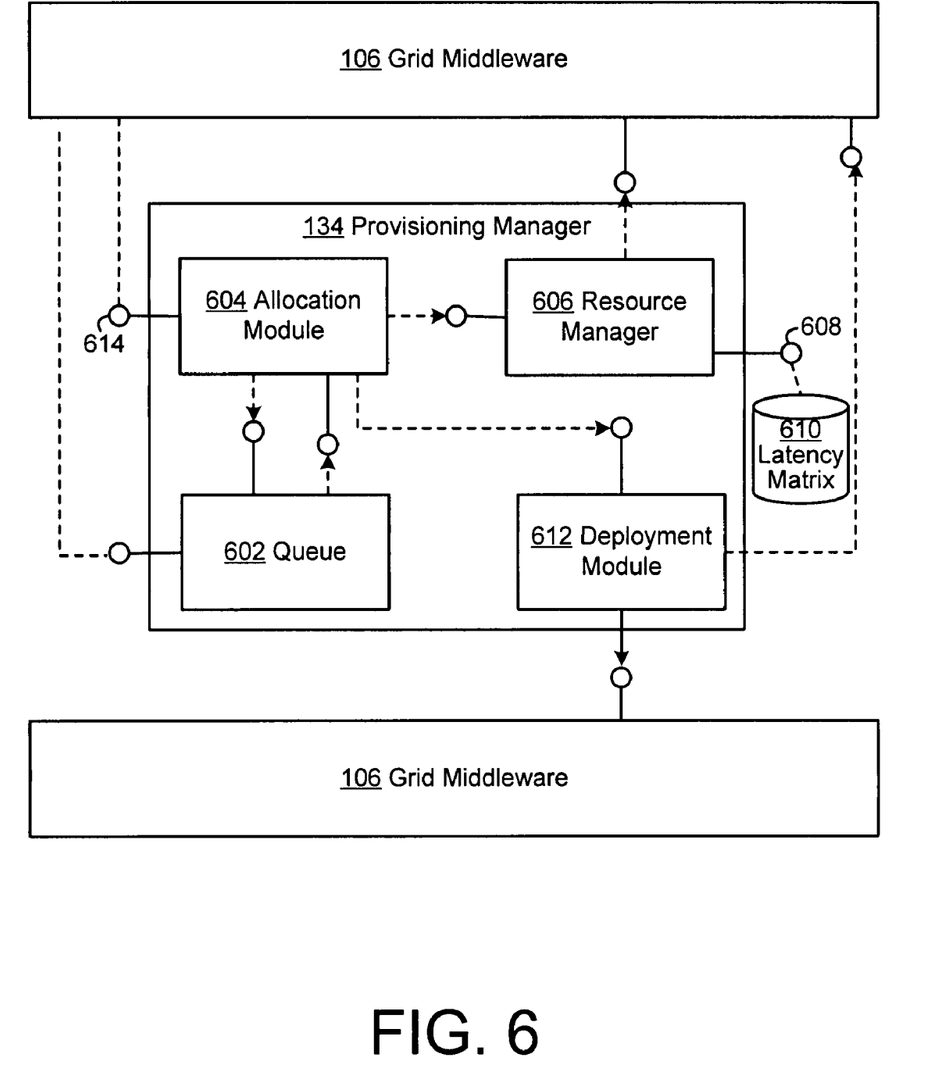
FIG. 6 is a block diagram of a provisioning manager of FIGS. 1 and 2.

FIG. 6 is a block diagram of a provisioning manager of FIGS. 1 and 2. In the example of FIG. 6, the provisioning manager 134 includes a queue 602 that receives task instances from the application 108 by way of the grid middleware 106. For example, the application 108 may implement a payroll processing scheme, which may instantiate various tasks at the end of each month, or as appropriate, for sending to the queue 602.

The various task instances may be queued and eventually passed to an allocation module 604. The allocation module 604 may receive the notification of the task instance, e.g., the task instance 116a, and may consult the mapping database 132 to determine an associated data partition, e.g., the data partition 122a.

The allocation module may then query a resource manager 606 to determine existing, available resources of the computing grid for executing the task instance. As described herein, such resources may include processing and/or memory resources (e.g., current utilization of each node's local database) of available nodes, as well as network or environmental resources such as bandwidth, quality of service (e.g., cost or security), or latency. In general, values for such parameters may be determined in real-time or close to real-time by querying appropriate nodes or other devices of the grid computing environment, e.g., over the grid middleware 106.

In other example implementations, such values may be determined ahead of time, either once or periodically, and stored for later access. For example, in FIG. 6, an interface 608 may be used to determine latency values between each pair of nodes in the grid computing environment. As just referenced, such latency values may be determined as-needed, or may be stored in a latency matrix 610 or other format. The interface 608 may be used to determine when new nodes are registered to the grid computing environment, or when current nodes are removed. The latency values may then be updated accordingly.

The allocation module 604 receives the resource information from the resource manager 606 and implements one or more algorithms based on characteristics of the task instance and data partition to be deployed, using the resource information provided by the resource manager 606 (including, e.g., the latency information). Although a number of different algorithms are possible, example algorithms are provided herein which are used to compare an execution time for the task instance in question if the task instance were to be transferred to a processing node (along with transfer of the associated data partition to a data node, which may be the same or different than the processing node), to a default execution time for the task instance if the task instance is transferred/deployed while the data partition remains at an initial node (e.g., at the central node 102).

Ultimately, the allocation module 604 may determine to deploy the task instance to a selected processing node, and may determine whether and where to deploy the associated data partition, as well. Then, the task instance and data partition may be identified to a deployment module 612, which may be used to provide both the task instance and the data partition onto desired nodes of the grid network. In so doing, it will be appreciated that the deployment module 612 may work in concert with conventional functionality of the federated database management system(s) 124 and/or the grid middleware 106.

The provisioning manager 134 may have various other capabilities and functionalities. For example, an interface 614 may represent an external interface with the grid middleware 106 that allows invocation of the allocation module 604 when a node is to be decommissioned and released from the computing grid, e.g., due to external reasons (e.g., desire of an administrator, re-allocation of resources, or failure of the decommissioned node). Then, the provisioning manager 134 may migrate the affected task instances and the relevant data partition to another node.

In so doing, the allocation module 604 may detect resources available on the destination node, e.g., by using the information from the resource manager 606. The allocation module 604 may then requests a node "i" with enough resources to host at least the data partition and, if possible, some or all of the affected task instances, as well. If it is not feasible to transfer all of the affected task instances to the node "i," then the allocation module 604 may request the resource manager 606 to provide a set of nodes "j" that are ordered by an amount of latency between the node "i" and each of the nodes "j," and which are able to host the remaining task instances.

Once the appropriate nodes are located, all task instances on the computing grid that are associated with the data partition to be migrated may be stopped, and the allocation module 604 may then call the deployment module 612 to transfer the data partition and to migrate the task instances from the node to be decommissioned to the newly-selected nodes. Finally, the allocation module 604 may check whether the latency related to all the other nodes hosting now-halted task instances has been substantially increased by the above operations. If so, then the task instances are migrated (redeployed) using the same technique just described of selecting a set of nodes "j" that are ordered with respect to latencies between each of the nodes "j" and the node "i."

In another example, if no task instances associated with one partition are active and no more task instances are scheduled for the relevant data partition, then the data partition may be transferred back to the central database 118. The request to transfer a data partition back to the central database 118 may be sent using the corresponding interface 614 of the allocation module 604.

Figure 7:
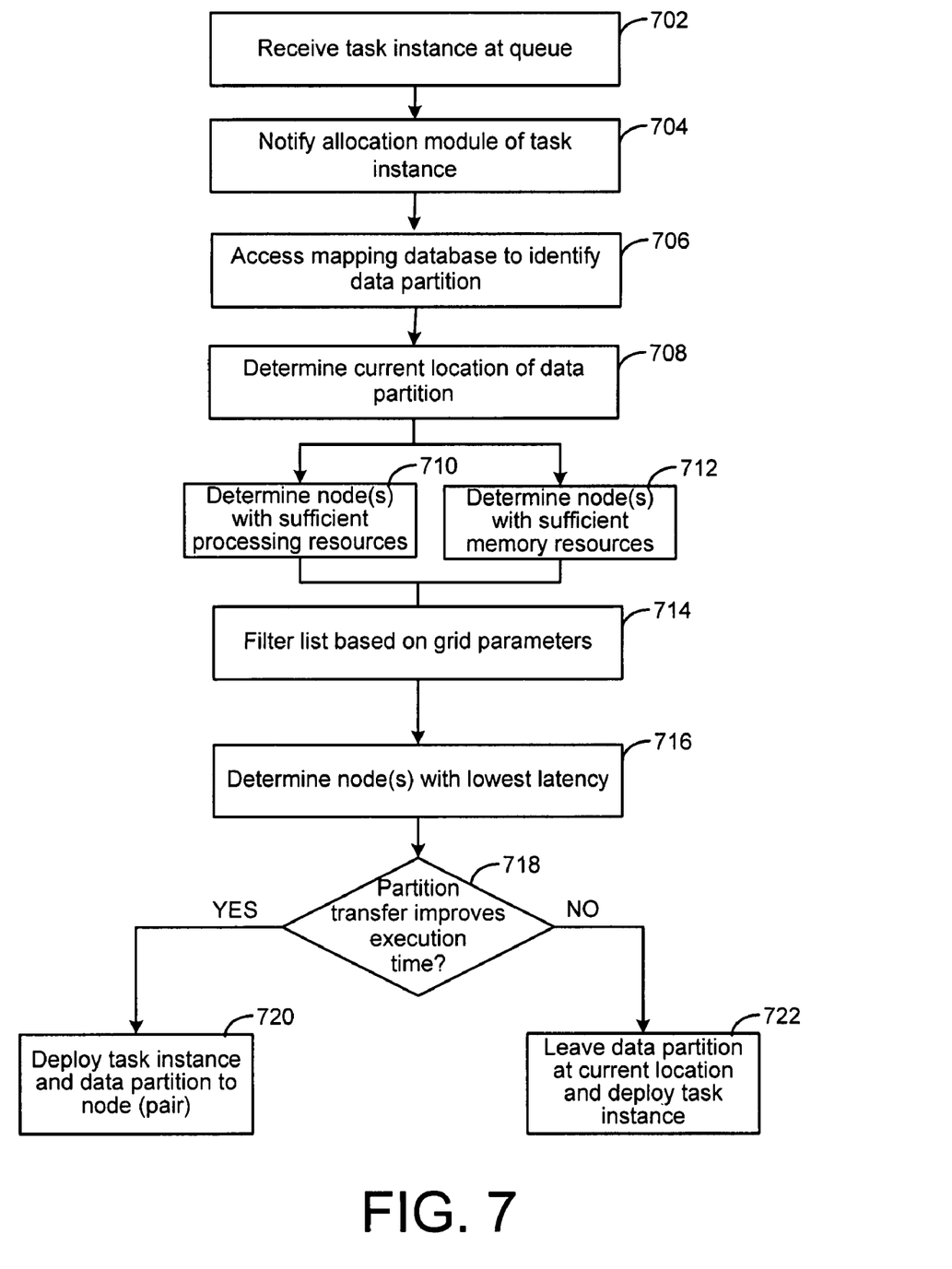
FIG. 7 is a flowchart showing example operations of the system of FIG. 6.

FIG. 7 is a flowchart 700 illustrating example operations of the provisioning manager of FIG. 6. In the example of FIG. 7, a task instance may be received at the queue 602 (702), and thereafter the queue 602 may notify the allocation module 604 of the arrival of the task instance (704). The allocation module 604 may thus access the mapping database 132 to determine which, if any, data partition is associated therewith (706) (e.g., is associated with the parent task from which the task instance was instantiated).

The allocation module 604, perhaps using the resource manager 134, may determine a current location of the relevant data partition (708), i.e., may determine the initial node from which the data partition may be transferred. As described above, the data partition may be stored at the central database 118, or at virtually any local database of one of the nodes of the grid environment (e.g., as the result of an earlier-executed transfer of the data partition thereto).

The allocation module 604 may then cause the resource manager 608 to determine nodes with sufficient processing resource(s) (710), and to determine nodes with sufficient memory resources (712). The resulting list(s) of nodes may be filtered based on relevant grid parameters (714). For example, such grid parameters may include quality of service characteristics, so that an otherwise-suitable node may be removed from the list(s) of nodes if that node does not have some defined quality of service threshold.

The resource manager 608 may use discovered or available latency information for pairs of nodes in the grid environment, and may apply this latency information to pairs of the various members of the lists of potential processing nodes and the list of potential data nodes. In advantageous implementations, it may occur that the list of potential processing nodes and the list of potential data nodes have at least one common or overlapping node, so that this node may have negligible latency for intranode communications. If not, then the resource manager 608 may determine a pair of the potential processing nodes and the potential data nodes that have the lowest latency (e.g., that are closest to one another). Thus, the resource manager 608 may determine processing and/or data node(s) with the lowest latency (716).

Generally, it may be assumed that the resource manager 608 may determine a single node or pair of nodes having all of the required processing, memory, and latency characteristics, and may thus transfer this node or pair of nodes to the allocation module 604. In practice, of course, it may occur that the resource manager 608 returns a plurality of nodes that each may serve as both the processing and data node (and would therefore have negligible latency). In this case, the resource manager 608 may use some other criteria to decide between these nodes, e.g., may select the first available node, or the closest node, or the node with the highest quality of service characteristics.

Then, the allocation module 604 may determine whether the transfer of the data partition from the initial node to the selected data node (along with deployment of the task instance to the processing node, which may or may note be the same as the data node), will improve an overall execution time of the task instance (718). Example algorithms and calculations for making this determination are provided in detail, below.

If the execution time will be improved with the transfer, then the task instance and the data partition may be deployed by the deployment module 612 to the node (pair) determined above (720). Otherwise, the deployment module 612 may deploy just the task instance to the processing node, while leaving the data partition at its current location, i.e., at the initial node (722).

As referenced above, a number of algorithms and calculations may be used by the allocation module 604 to determine whether the transfer of the data partition from the initial node to the selected data node, along with deployment of the task instance to the processing node, will improve an overall execution time of the task instance. In the example algorithm set forth below, the following variables and notation are used.

First, nodes are referred to using "i" or "j," so that, for example, a latency "l" between two nodes "i" and "j" may be designated as "$l_{ij}$." Similarly, a network bandwidth "b" between nodes may be designated as "$b_{ij}$."

Variables such as latency and bandwidth that are not specific to any particular task instance may be referred to as environment variables, while other variables may be specific to an execution of one or more specific task instance(s). For example, the time "t" for execution of a task instance, without regard to database access time requirements, may be written as "$t_{exe}$."

A task instance in this context may be considered to be a binary file "bin" that provides a specification for execution of the task instance. Similarly, a data partition may be designated as "part." As described above, both a binary file "bin" of a task instance and a data partition "part" may undergo a transfer "T" between nodes "i" and "j," where the node "i" may include the central node, which is a special case that may be designated as node "0."

Using the above notation, then, a time to transfer and deploy the binary file "bin" of a task instance from the central node 102 to a node "i" may be written as "$t_{Tbin-i}$." Similarly, a time to transfer and deploy the data partition "part" from the central node 102 to a node "j" may be written as "$t_{Tpart-j}$."

Also regarding notation, a particular database call may be expressed as call "k," while a number of database calls required by a task instance to a corresponding database may be written as a number of calls "c." A size of a file, whether a binary file "bin" of a task instance or whether a size of a data partition "part" (which also may be a binary file), may be expressed using the variable "s" for size. A time required to execute a database call "k" from node "i" to node "j" may be written as "$t_{call-kij}$."

Using the above notation, it may be assumed for the purposes of these examples that the network connection between node i and j has the same behavior as the connection between node j and i. Furthermore, it may be assumed that the latency for internal communication is effectively zero. These assumptions allow symmetric latencies and time matrices for the various nodes, with $l_{ij}=l_{ji}$ and $t_{call-kij}=t_{call-kji}$, and, if i=j, then $l_{ij}=t_{ij}=0$. In a final assumption for these examples, it may be assumed that the bandwidth between two different nodes in the computing grid is substantially constant throughout the grid, and the internal bandwidth on one node is negligibly high, so that if i=j then $b_{ij}=\infty$ else $b_{ij}=b$.

An entire execution time "t," including the deployment of the task instance on node i and the transfer of the necessary data partition to node j, may be represented, using the above notation, by Equation 1:

$$t_{ij} = \max(t_{Tbin-i}, t_{Tpart-j}) + t_{exe} + \sum_{k=1}^{c} t_{call-kij} \qquad \text{Eq. (1)}$$

Equation 1 provides for the sum of a number of time components that may contribute to an overall execution of a task instance that is deployed on node "i," together with transfer of the associated data partition to node "j."

The first time component deals with the time(s) necessary to execute the transfers of the task instance binary file "bin" and the data partition "part." Specifically, the term "$\max(t_{Tbin-i}, t_{Tpart-j})$" contemplates that since the deployment of the task instance and the transfer of the data partition happen independently, the effect on the overall execution time $t_{ij}$ depends only on the longer (i.e., the maximum) of both times.

The second time component, as appreciated from the above description of notation, is simply the execution time $t_{exe}$ needed to execute the binary file of the task instance, without regard for database access requirements. Finally, the third time component includes a summation of the times needed for all database calls between nodes "i" and "j."

Eq. (1) may be better understood by viewing in specific example contexts. For example, if the partition is not transferred, but is simply maintained in the central node 102, i.e., node 0, then the following effects may be seen in Eq. (1). Specifically, the time for transfer of the data partition is, by definition in this example, zero seconds, so that the first term "$\max(t_{Tbin-i}, t_{Tpart-j})$" simplifies to simply "$t_{Tbin-i}$," as shown in Eq. 2:

$$t_{i0} = \max(t_{Tbin-i}, t_{Tpart-0}) + t_{exe} + \sum_{k=1}^{c} t_{call-ki0}$$

$$= t_{Tbin-i} + t_{exe} + \sum_{k=1}^{c} t_{call-ki0}. \quad \text{Eq. (2)}$$

In Eq. (2), data calls still occur between the deployed task instance (i.e., on the processing node "i") and the central database 118 on the node "0," as shown by the third term of Eq. (2).

In another example, the data partition may be transferred to the same node i on which the job is deployed, i.e. j=i≠0. In this example, the assumption above of negligible time required for data calls within a node implies that the third term goes to zero seconds, as shown in Eq. (3):

$$t_{ii} = \max(t_{Tbin-i}, t_{Tpart-i}) + t_{exe} + \sum_{k=1}^{c} t_{call-kii}$$

$$= \max(t_{Tbin-i}, t_{Tpart-i}) + t_{exe}. \quad \text{Eq. (3)}$$

Using Eq. (2) and (3), a comparison may be made as to whether an entire execution time may improved when transferring the task instance and the data partition to node "i=j." In other words, if $t_{ii} \leq t_{i0}$, then a transfer of the associated data partition (in conjunction with deployment of the task instance) may be seen to reduce the overall task instance execution time. This inequality (and resulting simplification of removing the common term "$t_{exe}$") results in Eq. (4):

$$t_{ii} \leq t_{i0} \quad \text{Eq. (4)}$$

$$\max(t_{Tbin-i}, t_{Tpart-i}) + t_{exe} \leq t_{Tbin-i} + t_{exe} + \sum_{k=1}^{c} t_{call-ki0}$$

$$\max(t_{Tbin-i}, t_{Tpart-i}) \leq t_{Tbin-i} + \sum_{k=1}^{c} t_{call-ki0}$$

If a further assumption is made for the sake of example that the deployment of the task instance takes at least as long as the transfer of the data partition, i.e., $t_{Tbin-i} \geq t_{Tpart-i}$, then the term "$\max(t_{Tbin-i}, t_{Tpart-j})$" becomes just "$t_{Tbin-i}$," resulting in Eq. (5)

$$t_{Tbin-i} \leq t_{Tbin-i} + \sum_{k=1}^{c} t_{call-ki0} \quad \text{Eq. (5)}$$

$$0 \leq \sum_{k=1}^{c} t_{call-ki0}$$

Thus, Eq. (5) simply makes the point that if the deployment of the task instance takes at least as long as the transfer of the data partition, then it may be seen that a transfer of the data partition to node "i" may be considered to be an improvement in the overall execution time. This may be seen from the fact that if the data partition transfer may occur during the time required by the task instance deployment, then there is essentially no cost or effect on the overall execution time $t_{ii}$, and so the transfer of the data partition should proceed in order to gain the benefit of a reduced time required to make data calls to the data partition (i.e., for data calls within the node itself, as opposed to data calls made back to the central database).

In the reverse case, however, where the time to transfer the data partition is longer than the time required to deploy the task instance, the result is shown in Eq. (6):

$$t_{Tpart-i} \leq t_{Tbin-i} + \sum_{k=1}^{c} t_{call-ki0}. \quad \text{Eq. (6)}$$

In order to solve this inequality at runtime, the allocation module 604 may substitute values for the various time variables, and compute a result.

Toward this end, the various time variables may be expressed in terms of values and units that are known to, and/or may be calculated by, the allocation module 604. Such expressions are provided below in the examples of Eqs. (7-9).

For example, times for transferring data in the grid network may be described as a function of the size s of the data (e.g., in bytes), the bandwidth "b," and the latency "l." For example, Eq. (7) expresses the time for transfer of the data partition to node "i" in terms of the size of the partition being transferred, the latency between the central node 102 and the node "i," and the relevant bandwidth "b."

$$t_{Tpart-i} = l_{i0} + s_{Tpart-i}/b \quad \text{Eq. (7)}$$

The time required for the relevant data calls may be written as below in Eq. (8), which includes two latency terms "$l_{i0}$" and "$l_{0i}$" to account for latencies in the request and response for the data call(s):

$$t_{data-ki0} = l_{i0} + s_{data-k}/b + l_{0i} \quad \text{Eq. (8)}$$

The time required to deploy the task instance (e.g., transfer the job binary) may be written as in Eq. (9), which, similar to Eq. (7) and (8), depends on the size of the binary, the bandwidth, and the latency between the central node and the node "i," as well as on a time $t_{deploy}$ that is associated with time needed to actually deploy the transferred binary file of the task instance on the local server of the node "i" (e.g., the server 126*b* of FIG. 1).

$$t_{Tbin-i} = l_{0i} + s_{Tbin-i}/b + t_{deploy} \quad \text{Eq. (9)}$$

Substituting Eqs. (7), (8), and (9) into the inequality of Eq. (6) provides the result of Eq. (11):

$$l_{0i} + \frac{s_{Tpart-i}}{b} \leq l_{0i} + \frac{s_{Tbin-i}}{b} + t_{deploy} + \sum_{k=1}^{c}\left(\frac{s_{data-k}}{b} + 2 \cdot l_{i0}\right) \quad \text{Eq. (11)}$$

Since $t_{deploy} \geq 0$, the condition above is true if Eq. (12) holds:

$$l_{0i} + \frac{s_{Tpart-i}}{b} \leq l_{0i} + \frac{s_{Tbin-i}}{b} + \sum_{k=1}^{c}\left(\frac{s_{data-k}}{b} + 2 \cdot l_{i0}\right) \quad \text{Eq. (12)}$$

Consequently, a decision as to whether to perform the transfer of the data partition may be written as in Eq. (13), where the term "2c" accounts for the full duplex nature of the communications associated with the relevant data calls:

$$s_{Tpart-i} - s_{Tbin-i} \leq 2c \cdot l_{i0} \cdot b + \sum_{k=1}^{c} s_{data-k} \quad \text{Eq. (13)}$$

As may be appreciated, Eq. (13) implies that, for transfer of the data partition to be beneficial in the example circumstance, a difference in size between the size of the data partition and the size of the task instance binary file (i.e., the left hand side of the inequality) must be less than an amount determined by the number of data calls, the relevant latency and bandwidth, and the size of the data calls (i.e., the right hand side of the inequality). This condition(s) is more likely to occur in the presence of a high latency "$l_{i0}$," a large bandwidth "b," a large number of database calls, and/or a large amount of data "$s_{data-k}$" to be sent. In this regard, it will be appreciated that the present description, as discussed above, is intended for data-intensive applications (i.e., "c" and "$s_{data-k}$" are likely to be large) which are to be grid-enhanced (i.e., grid-related geographical dispersion increases the likelihood of a high latency "$l_{i0}$"). Consequently, many or all of the above conditions are likely to hold in the scenarios described, and in other similar scenarios, and benefits in these situations from the transfer of the data partition may be obtained.

Similar calculations may be performed in other, similar scenarios. For example, the above calculations are provided with respect to the situation where the data partition is to be deployed from the central node (i.e., with the central node as the initial node). If, however, another node "j" is currently storing the data partition (i.e., will serve as the initial node), and another node "i" can be found to host the relevant task instance and having "$l_{i0}$" being at least as large as "$l_{ij}$" then a performance improvement may be obtained by deploying the task instance to node "i." Of course, if i=j, then the latency "$l_{ij}$" goes to zero, and the just-mentioned condition will hold.

The above description is for the sake of example, and is not limiting of other example implementations. For example, the calculations above evaluate whether there may be a performance improvement when transferring the data partition on the basis of a single task instance. However, at runtime, there may be more than one instance of the same task. If it is a goal is to improve the average performance of a task as a whole, then the accumulated performance of all associated task instances may be considered. For example, the provisioning manager 134 may determine at the time the first task instance enters the queue 602 that, in fact, a total of "m" task instances are expected.

In this example, then, a condition in favor of transferring a data partition when a single task requires "m" task instances is given below in Eq. (14). In Eq. 14, it will be appreciated that for "(m−1)" task instances, only the sum of the binary transferal time and the deployment time ($t'_{ii}$) needs to be considered.

$$t_{ii} + (m-1) \cdot t'_{ii} \leq m \cdot t_{i0} \qquad \text{Eq. (14)}$$

$$\max(t_{Tbin-i}, t_{Tpart-i}) + t_{exe} + (m-1) \cdot (t_{Tbin-i} + t_{exe}) \leq$$

$$m \cdot (t_{Tbin-i} + t_{exe}) \leq m \cdot \left( t_{Tbin-i} + t_{exe} + \sum_{k=1}^{c} t_{call-ki0} \right)$$

$$\max(t_{Tbin-i}, t_{Tpart-i}) \leq t_{Tbin-i} + m \cdot \sum_{k=1}^{c} t_{call-ki0}$$

$$s_{Tpart-i} - s_{Tbin-i} \leq m \cdot \left( 2c \cdot l_{i0} \cdot b + \sum_{k=1}^{c} s_{data-k} \right)$$

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising at least one processor, instructions recorded on a non-transitory computer-readable storage medium and executable by the at least one processor, the instructions comprising:
   a partition analyzer configured to cause the at least one processor to designate at least one data partition within a database of a grid network, and further configured to perform a mapping of the data partition to at least one task of an application, the application to be at least partially executed within the grid network; and
   a provisioning manager configured to cause the at least one processor to:
      determine a task instance of the at least one task,
      determine the data partition, based on the mapping, the data partition being stored at an initial node of the grid network,
      determine a processing node of the grid network having processing resources required to execute the task instance and a data node of the grid network having memory resources required to store the data partition, based on a latency therebetween,
      make a comparison as to whether an execution time of the task instance with the data partition at the data node will be less than a default execution time of the task instance with the data partition remaining at the initial node,
      deploy the task instance to the processing node, and
      re-locate the data partition from the initial node to the data node, based on the comparison,
   wherein the provisioning manager includes an allocation module configured to make the comparison by calculating the execution time and the default execution time as including an instance execution time of the task instance and a data call time required by the task instance to make data calls to the data partition.

2. The system of claim 1 wherein the partition analyzer is configured to designate the at least one data partition based on an access characteristic of the task with respect to the data partition.

3. The system of claim 2 wherein the access characteristic includes an anticipated frequency of access of the data partition by one or more future task instances.

4. The system of claim 1 wherein the initial node includes a central node of the grid network at which the database is stored.

5. The system of claim 1 wherein the initial node includes a previous data node to which the at least one data partition was previously deployed as part of a previous provisioning operation of the provisioning manager.

6. The system of claim 1 wherein the provisioning manager comprises:
   a resource manager configured to:
      determine a first plurality of nodes of the grid network having the processing resources, the first plurality of nodes including the processing node,
      determine a second plurality of nodes of the grid network having the memory resources, the second plurality of nodes including the data node, and
      determine the processing node and the data node by determining latencies between combinations of nodes of the first plurality of nodes and nodes of the second plurality of nodes.

7. The system of claim 6 wherein the resource manager is configured to determine the processing node and the data node by determining that the latency therebetween is less than a latency between other combinations of the combinations of nodes.

8. The system of claim 6 wherein the first plurality of nodes and the second plurality of nodes include a common node, and wherein the provisioning manager is configured to select the common node as both the processing node and the data node.

9. The system of claim 6 wherein the provisioning manager comprises:
   a resource manager configured to filter one or more nodes from one or both of the first plurality of nodes and the second plurality of nodes, based on a grid transmission characteristic associated with the grid network.

10. The system of claim 1 wherein the
   allocation module is configured to make the comparison by calculating the execution time as including the larger of a deployment time of deploying the task instance and a transfer time of transferring the data partition from the initial node to the data node, and by calculating the default execution time as including the deployment time of deploying the task instance.

11. The system of claim 1 wherein the provisioning manager is configured to transfer the data partition from the initial node to the data node, based on the comparison, using a federated database management system.

12. A method comprising:
   determining a task instance to be executed;
   determining a data partition associated with execution of the task instance and stored at an initial node of a grid network;
   determining a processing node of the grid network having processing resources required to execute the task instance and a data node of the grid network having memory resources required to store the data partition, based on a latency therebetween;
   making a comparison as to whether an execution time of the task instance with the data partition at the data node will be less than a default execution time of the task instance with the data partition remaining at the initial node;
   deploying the task instance to the processing node; and
   re-locating the data partition from the initial node to the data node, based on the comparison,
   wherein making the comparison includes calculating the execution time as including the larger of a deployment time of deploying the task instance and a transfer time of transferring the data partition from the initial node to the data node.

13. The method of claim 12 wherein determining the data partition comprises:
   accessing a previously-performed mapping of a task of an application from which the task instance was instantiated to the data partition, the mapping being associated with an access characteristic of the task instance with respect to the data partition.

14. The method of claim 12 wherein determining the latency comprises:
   determining a first plurality of nodes of the grid network having the processing resources, the first plurality including the processing node;

determining a second plurality of nodes of the grid network having the memory resources, the second plurality including the data node; and determining the processing node and the data node by calculating latencies between nodes of the first plurality of nodes and nodes of the second plurality of nodes.

15. A computer program product tangibly embodied on a non-transitory computer-readable storage medium and including executable code that, when executed, is configured to cause a data processing apparatus to:

receive a task instance to be executed on a grid network, the task instance being instantiated from a task of an application;

determine a data partition from a database associated with the application, based on the task instance, the data partition being associated with the task and stored on an initial node of the grid network;

determine a processing node of the grid network having sufficient processing resources to execute the task instance;

determine a data node of the grid network having sufficient memory resources to store the data partition;

determine that an execution time of the task instance at the processing node with the data partition having been transferred from the initial node to the data node is less than a default execution time of the task instance at the processing node with the data partition remaining at the initial node;

deploy the task instance to the processing node; and transfer the data partition from the initial node to the data node, wherein the execution time includes the larger of a deployment time of deploying the task instance and a transfer time of transferring the data partition from the initial node to the data node.

16. The computer program product of claim 15 wherein the processing node and the data node are selected based on a latency therebetween.

17. The computer program product of claim 15 wherein grid middleware associated with the grid network is associated with one or more of receiving the task instance, deploying the task instance to the processing node, and transferring the data partition from the initial node to the data node.

* * * * *